US008868247B2

(12) United States Patent
Shaffer et al.

(10) Patent No.: US 8,868,247 B2
(45) Date of Patent: Oct. 21, 2014

(54) CROSS-PROFILE COORDINATION OF ENERGY CONSUMPTION POLICIES

(75) Inventors: Shmuel Shaffer, Palo Alto, CA (US); David I. Leimbrock, Santa Barbara, CA (US); Richard G. Geiger, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 713 days.

(21) Appl. No.: 13/098,086

(22) Filed: Apr. 29, 2011

(65) Prior Publication Data
US 2012/0277921 A1 Nov. 1, 2012

(51) Int. Cl.
G06F 1/28 (2006.01)
H02J 3/14 (2006.01)
G06Q 10/06 (2012.01)
G06Q 50/06 (2012.01)

(52) U.S. Cl.
CPC .............. H02J 3/14 (2013.01); *Y02B 70/3225* (2013.01); G06Q 10/06 (2013.01); G06Q 50/06 (2013.01); *Y04S 20/222* (2013.01)
USPC ........................................................ 700/291

(58) Field of Classification Search
None
See application file for complete search history.

(56) References Cited

U.S. PATENT DOCUMENTS

| 4,023,043 | A | 5/1977 | Stevenson |
| 7,472,290 | B2 | 12/2008 | Diab et al. |
| 7,903,597 | B2 | 3/2011 | Biederman et al. |
| 8,457,803 | B2 * | 6/2013 | Willig et al. ................. 700/291 |
| 2005/0234600 | A1 | 10/2005 | Boucher et al. |
| 2009/0048718 | A1 | 2/2009 | Richard et al. |
| 2009/0052372 | A1 | 2/2009 | Durazzo et al. |
| 2009/0219145 | A1 | 9/2009 | Wong et al. |
| 2010/0042855 | A1 | 2/2010 | Karam |
| 2010/0063643 | A1 * | 3/2010 | Boss et al. .................... 700/291 |
| 2010/0217451 | A1 | 8/2010 | Kouda et al. |
| 2011/0320795 | A1 * | 12/2011 | Bosisio et al. .................... 713/1 |
| 2012/0254851 | A1 * | 10/2012 | Diab ............................ 717/171 |

OTHER PUBLICATIONS

Kauko, Tuomas, "Notification of Transmittal of the International Search Report and the Written Opinion of the International Searching Authority, or the Declaration", Patent Cooperation Treaty, Jan. 7, 2013, 14 pages, European Patent Office, Rijswijk, Netherlands.
Kauko, Tuomas, "Invitation to Pay Additional Fees and, Where Applicable, Protest Fee", Patent Cooperation Treaty, Oct. 16, 2012, 6 pages, European Patent Office, Rijswijk, Netherlands.

(Continued)

*Primary Examiner* — Sean Shechtman
*Assistant Examiner* — Steven Garland
(74) *Attorney, Agent, or Firm* — Edwards Wildman Palmer LLP; James M. Behmke; Jonathon P. Western

(57) ABSTRACT

In one embodiment, a policy coordination device receives soft policies from a plurality of localized energy consumption control devices, and examines the received soft policies to determine corresponding energy consumption. From this, the policy coordination device creates a global policy to reduce overall peak energy consumption between the received soft policies. As such, the policy coordination device transmits corresponding policy control commands to one or more of the plurality of localized energy consumption control devices based on the global policy. In another embodiment, a particular localized energy consumption control device discloses its soft policies and in response, receives a policy control command from the policy coordination device to control operation of one or more energy consuming devices (within soft limits of the soft policies) based on the global policy.

20 Claims, 9 Drawing Sheets

(56) References Cited

OTHER PUBLICATIONS

Nickitas-Etienne, et al., "Notification Concerning Transmittal of the International Preliminary Report on Patentability", Patent Cooperation Treaty, International Application No. PCT/US2012/034948, mailed Nov. 7, 2013, 9 pages, The International Bureau of WIPO, Geneva, Switzerland.

* cited by examiner

CROSS-PROFILE COORDINATION OF ENERGY CONSUMPTION POLICIES

TECHNICAL FIELD

The present disclosure relates generally to controlling energy consumption, and, more particularly, to computer networks for controlling energy consumption.

BACKGROUND

Electric power is generally transmitted from generation plants to end users (residential, commercial, and industrial (C&I), etc.) via a transmission grid consisting of a network of power stations, transmission circuits, and substations interconnected by powerlines. Once at the end users, electricity can be used as energy to power any number of devices. Controlling peak energy demand/consumption is beneficial to both utilities and to consumers. For instance, electrical utility companies design their systems, including generation, transmission, and distribution, to account for peak energy demand, often resulting in under-utilized systems for a vast majority of time.

In addition, the electrical power rate of commercial and industrial (C&I) consumers generally depends on the peak electrical power they consume. In general, by reducing peak demand, customers may reduce their overall electrical bill. To this end many C&I consumers install energy controllers to coordinate the energy consumption of their various electrical systems (e.g., heaters and air conditioners) with the goal of reducing their peak energy consumption. For example, C&I facility managers may configure a policy for controlling the energy consumption of their facility resulting in a flatter energy consumption curve. This optimization of energy consumption, however, is performed by each company independently. That is, energy consumption profiles may be considered confidential, and may reveal information about operations which companies are not willing to share with each other.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a policy coordination device receives soft policies from a plurality of localized energy consumption control devices, and examines the received soft policies to determine corresponding energy consumption and from this, creates a global policy to reduce overall peak energy consumption between the received soft policies. As such, the policy coordination device transmits corresponding policy control commands to one or more of the plurality of localized energy consumption control devices based on the global policy.

According to one or more additional embodiments of the disclosure, a particular localized energy consumption control device receives one or more configured soft policies with soft limits, and discloses the one or more soft policies to a policy coordination device operable to receive soft policies from a plurality of localized energy consumption control devices. Accordingly, the particular localized energy consumption control device receives a policy control command from the policy coordination device to control operation of one or more energy consuming devices within the soft limits based on a global policy determined by the policy coordination device based on the soft policies from the plurality of localized energy consumption control devices. The particular localized energy consumption control device then operates based on the policy control command to control the one or more associated energy consuming devices.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The communication in computer networks may utilize, but are not limited to utilizing, various types of links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others.

Figure 1:
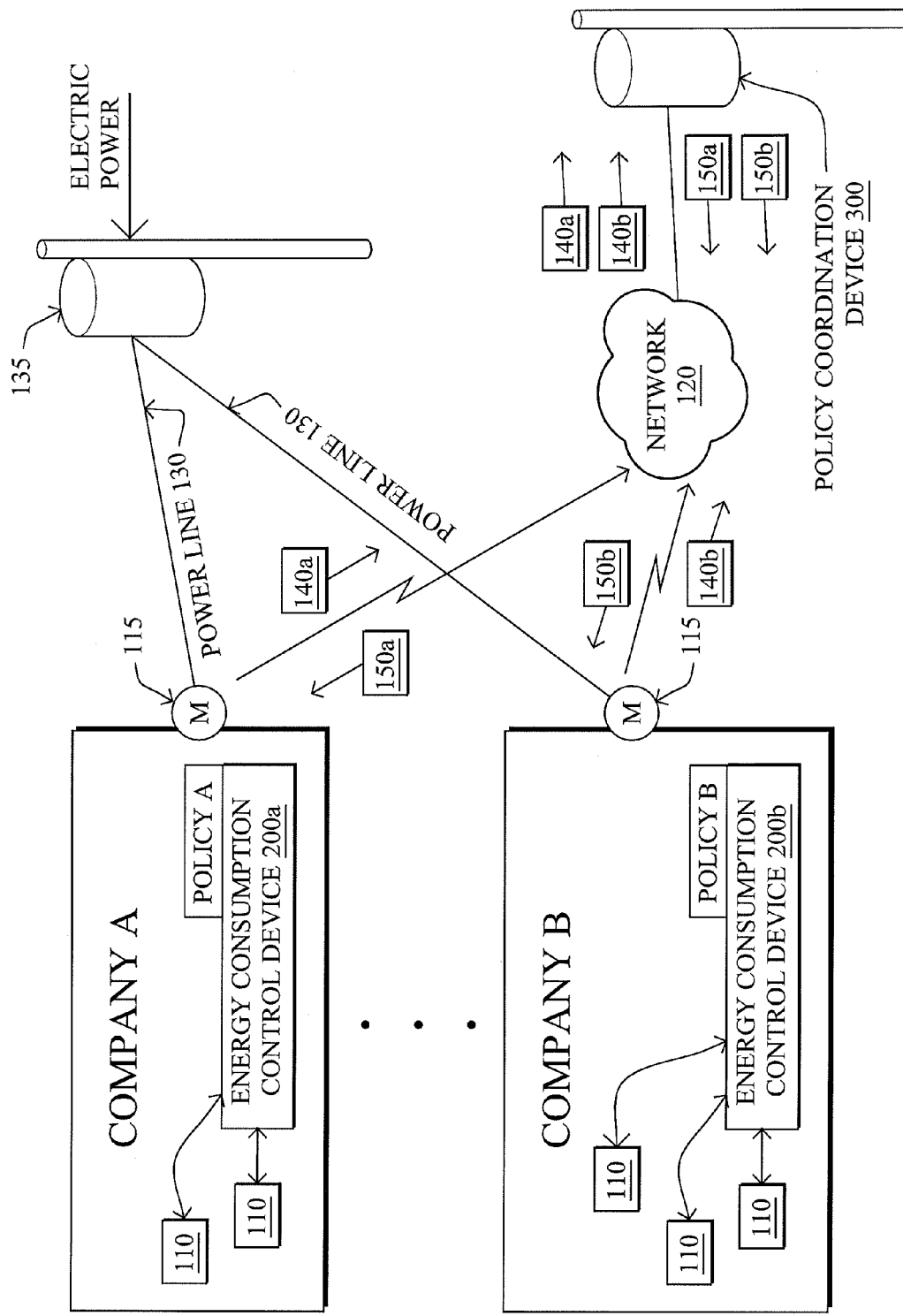
FIG. 1 illustrates an example energy distribution network.

FIG. 1 is a schematic block diagram of an example energy distribution network 100 illustratively comprising a field area network (FAN). Those skilled in the art will understand that the view shown herein is for simplicity, and is not meant to limit the scope of the embodiments herein. As shown, two companies, Company A and Company B, may each receive electric power though a shared transformer or substation 135 over their respective power lines 130. Meters 115 at each company provide the power to the company in a conventional manner, in addition to providing metering functionality. In particular, in accordance with an illustrative embodiment, meters 115 may also provide certain communication connectivity (e.g., wirelessly) to a computer network 120. The network 120 may comprise a computer network (e.g., the internet), or more particularly, may comprise a mesh network, fiber network, PLC network, etc., and may be connected to an illustrative policy coordination device 300 (e.g., collocated with a directed acyclic graph root device) described below with reference to FIG. 3. Note that while the device 300 and transformer 135 are shown on separate "poles," the devices may share physical location (e.g., a same pole, a same substation, etc.), and the view herein is merely for illustration.

Within each company is one or more energy consuming devices 110, such as lights, heaters, air conditioners, computers, industrial machinery, etc. According to the embodiments herein, particular energy consuming devices 110 communicate with an energy consumption control device 200*a/b* (described below with reference to FIG. 2). In particular, as described below, an energy consumption control device 200, of which a particular company may deploy more than one, communicates with each device 110 using their own protocol to monitor, measure, and control the operation of devices 110. (Note that where multiple energy consumption control devices 200 exist within a single company/entity/campus, a network building manager (NBM) may be used to consolidate the information. For purposes of discussion herein, an NBM is a type of energy consumption control device 200.)

Data packets (e.g., traffic and/or messages 140/150, described below) may be exchanged among the nodes/devices of the network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other.

Figure 2:
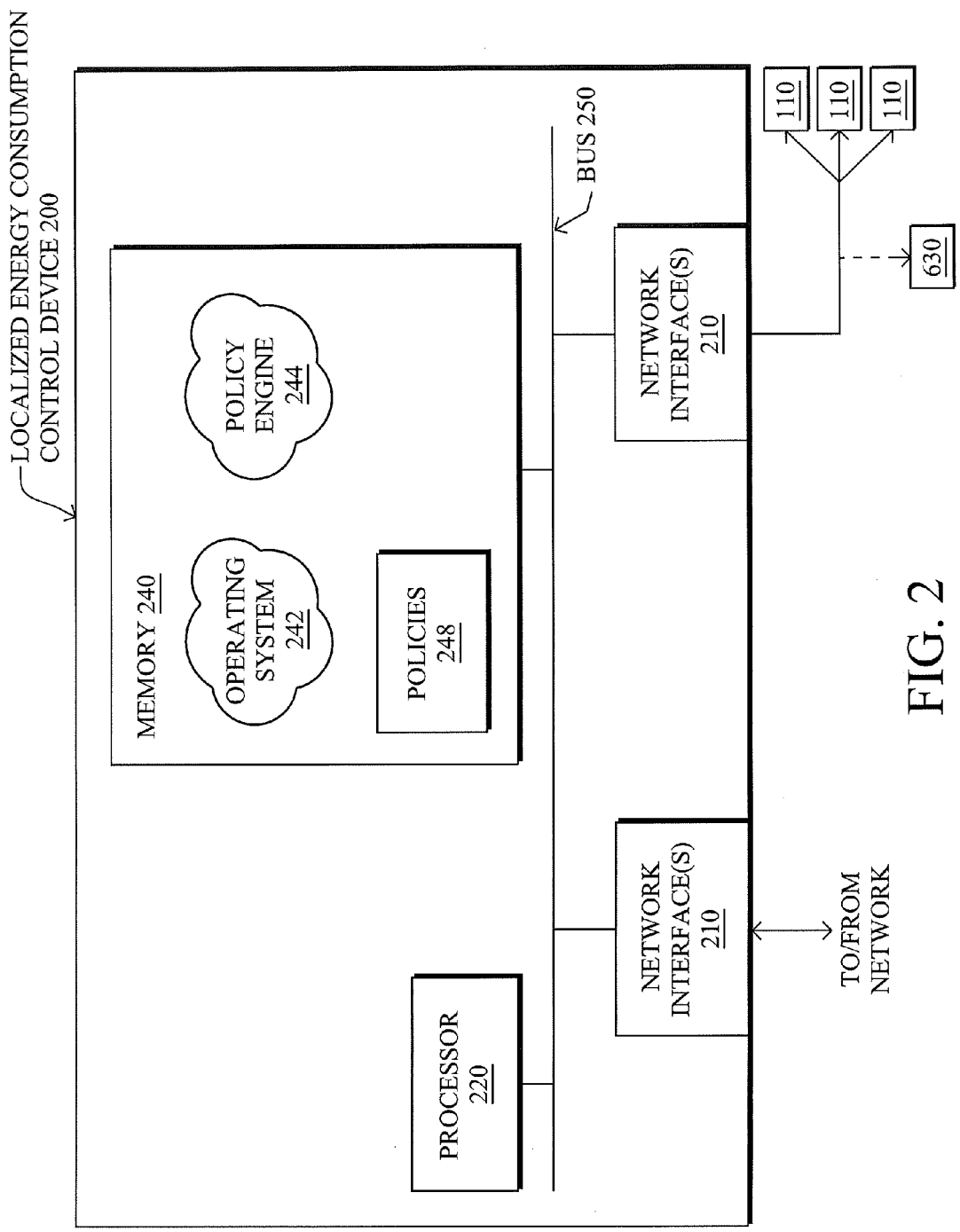
FIG. 2 illustrates an example energy consumption control device.

FIG. 2 is a schematic block diagram of an example localized energy consumption control device 200 that may be used with one or more embodiments described herein, e.g., a "Mediator" device available from Cisco Systems, Inc., of San Jose, Calif. The device 200 may comprise one or more network interfaces 210, a processor 220, and a memory 240 interconnected by a system bus 250. The network interfaces 210 contain the mechanical, electrical, and signaling circuitry for communicating data over physical and/or wireless links coupled to the network 120 and/or energy consuming devices 110. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, powerline communication (PLC) protocols, etc. Note that certain devices may have two different types of network connections 210. For instance, devices may have one or more interfaces used to communicate with other devices within the computer network (e.g., a mesh cell), and a different interface or interfaces may be used for communicating with various consuming devices 110.

The memory 240 comprises a plurality of storage locations that are addressable by the processor 220 for storing software programs and data structures associated with the embodiments described herein. The processor 220 may comprise necessary elements or logic adapted to execute the software programs and manipulate the data structures, such as policies 248 (e.g., soft policies, or other policies, as described below). An operating system 242, portions of which are typically resident in memory 240 and executed by the processor, functionally organizes the device by, inter alia, invoking operations in support of software processes and/or services executing on the device. These software processes and/or services may illustratively comprise a policy engine (process) 244, for use as described herein.

Figure 3:
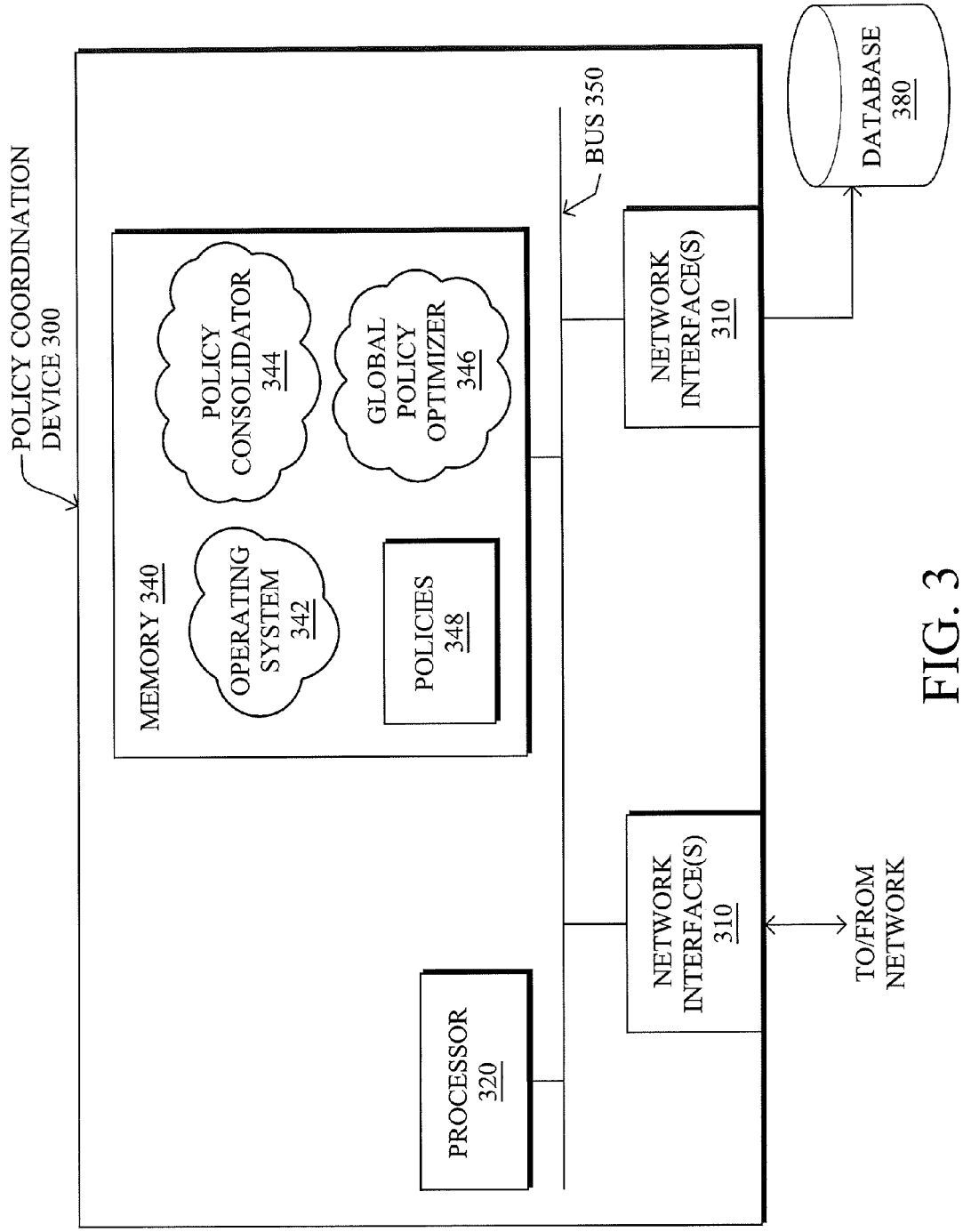
FIG. 3 illustrates an example policy coordination device.

In addition, FIG. 3 is a schematic block diagram of an example policy coordination device 300 that may be used with one or more embodiments described herein, e.g., a field area network (FAN) router available from Cisco Systems, Inc., of San Jose, Calif. The device 300 may comprise one or more network interfaces 310, a processor 320, and a memory 340 interconnected by a system bus 350. The network interfaces 310 contain the mechanical, electrical, and signaling circuitry for communicating data over physical and/or wireless links coupled to the network 120 and particularly to localized energy consumption control devices 200. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, PLC protocols, etc.

The memory 340 comprises a plurality of storage locations that are addressable by the processor 320 for storing software programs and data structures associated with the embodiments described herein. The processor 320 may comprise necessary elements or logic adapted to execute the software programs and manipulate the data structures, such as policies 348 (e.g., received soft policies, as described below). An operating system 342, portions of which are typically resident in memory 340 and executed by the processor, functionally organizes the device by, inter alia, invoking operations in support of software processes and/or services executing on the device. These software processes and/or services may illustratively comprise a policy consolidator (process) 344 and a global policy optimizer (process) 346, for use as described herein.

It will be apparent to those skilled in the art that other processor and memory types, including various computer-readable media, may be used to store and execute program instructions pertaining to the techniques described herein for devices 200 and/or 300. Also, while the description illustrates various processes, it is expressly contemplated that various processes may be embodied as modules configured to operate in accordance with the techniques herein (e.g., according to the functionality of a similar process).

As noted above, controlling peak energy demand/consumption is beneficial to both utilities and to consumers. For instance, consumers may configure a policy for controlling the energy consumption of their facility resulting in a flatter energy consumption curve. This optimization of energy consumption, however, is performed by each company independently. That is, energy consumption profiles may be considered confidential, and may reveal information about operations which companies are not willing to share with each other. While utility companies welcome the reduction of peak demand by each of their customers, the fact that each company achieves an independent local optimization still does not provide for global optimization.

Figure 4:
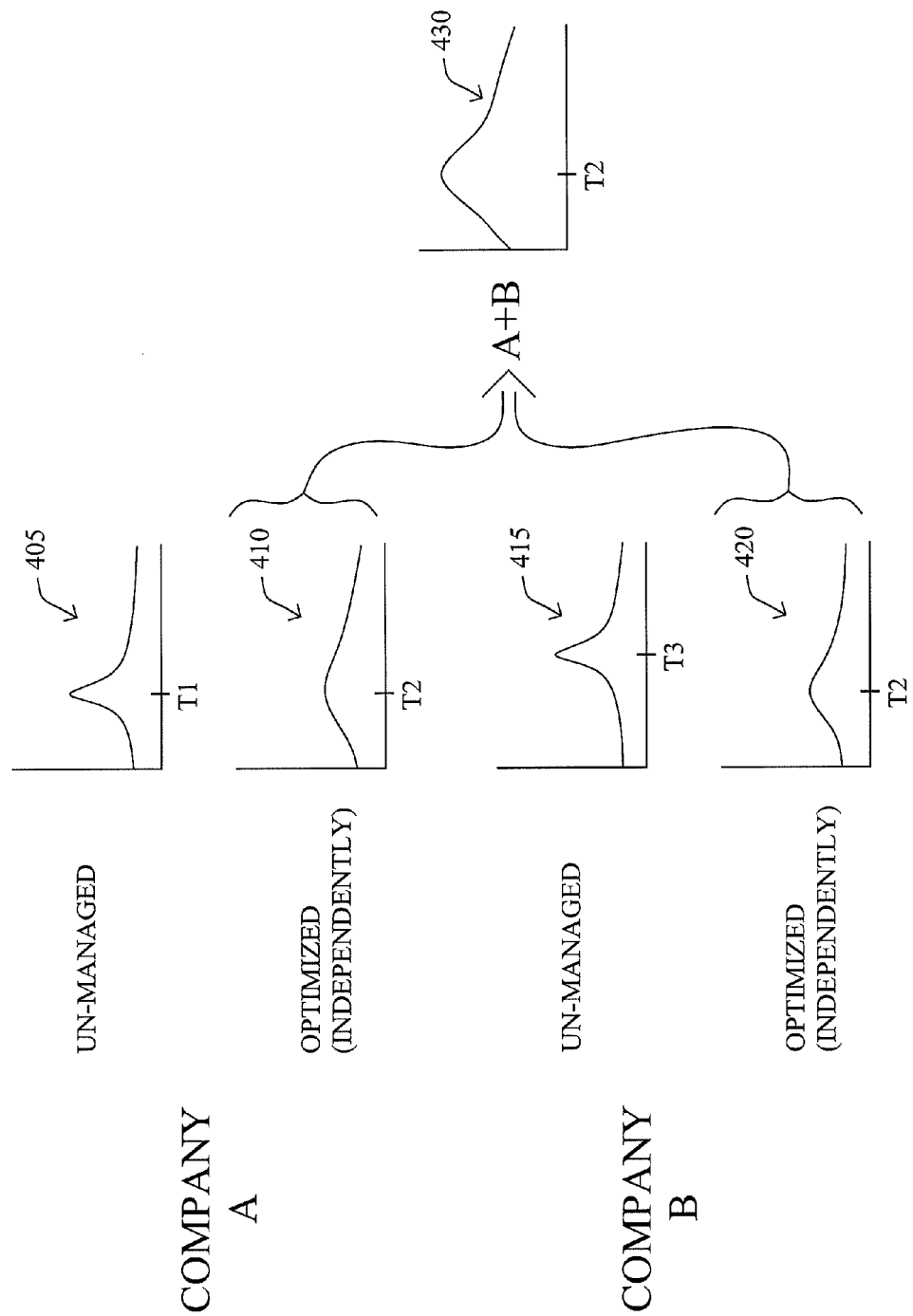
FIG. 4 illustrates an example of independently optimized energy policies.

FIG. 4 illustrates an example result of independently optimized energy policies. The goal of each individual policy may be to reduce the energy levels of each company, such as turning off lights if a facility is not occupied, and, more particularly, to stagger start-up of devices 110 such as heaters, air conditioners, generators, etc. to reduce spikes/peak consumption, etc. As shown (for illustrative explanation purposes only), "company A" has an un-managed power consumption 405 with a large peak at a particular time T1. Company A's "policy A" may be used to provide local optimization, albeit without knowing the operating environment of its neighboring companies which draw energy from the same distribution grid transformer or substation, to spread out the power consumption 410 over time (e.g., altering start-up times), and effectively reducing the peak consumption (now at time T2). At the same time, however, company B's "policy B" may change the energy consumption (peaking at T3 in 415) to a similarly timed peak effectively at time T2 in 420. The effect seen by the utility company as illustrated in 430, then, is a large energy consumption peak at T2, which in this example is actually larger than what the combined un-managed individual peaks at T1 and T3 would have resulted in had individual optimization not occurred.

The techniques herein therefore provide for cross enterprise and cross-profile coordination of energy consumption policies. In particular, the embodiments herein provide a manner in which energy policies of non-cooperating companies can be harmonized without having the companies disclosing their energy profiles to each other. The resulting system enables automated optimization of energy consumption at a transformer or a substation level. Specifically, according to one or more embodiments of the disclosure as described in greater detail below, a policy coordination device receives policies including soft policies from a plurality of (e.g., non-cooperating) localized energy consumption control devices, examines the received soft policies to determine corresponding energy consumption, and, from this, creates a global policy to reduce overall peak energy consumption between the received soft policies. As such, the policy coordination device transmits corresponding policy control commands to one or more of the plurality of localized energy consumption control devices based on the global policy. According to one or more embodiments of the disclosure as described in greater detail below, a particular localized energy consumption control device discloses at least its soft policies and in response, receives a policy control command from the policy coordination device to modify its own policy used to control operation of one or more energy consuming devices (within soft limits of the soft policies) based on the global policy.

Illustratively, the techniques described herein may be performed by hardware, software, and/or firmware. For example, techniques related to the energy consumption control devices 200 may be executed in accordance with policy engine 244, which may contain computer executable instructions executed by the processor 220 to perform functions relating to the novel techniques described herein. In addition, for policy coordination devices 300, a policy consolidator process 344 and global policy optimizer process 346 may contain computer executable instructions executed by the processor 320 to cooperate to obtain soft policies and manage global polices, respectively, as described herein.

Operationally, the software framework of an energy consumption control device includes a policy engine 244 that is used to orchestrate the behavior of electromechanical devices in response to various system inputs. In accordance with one or more embodiments herein, the policy engine facilitates the receipt of one or more configured soft policies, e.g., from a local administrator or a remote administration device, as well as facilitating the advertising of those soft policies. Soft policies, in general, are policies which do not dictate specific actions in response to specific trigger points but rather specify the desired behavior or outcome while leaving the specific action and timing to the energy consuming devices 110. Hence, soft policies can be said to have "soft limits" where energy consuming devices 110 operate within the soft limits, e.g., time periods for start-up or operation, ranges of acceptable power levels (e.g., fan speeds, light intensity, etc.), or other factors, such as ambient temperature settings. For instance, "slack" is a term used to describe the potential of an energy load to be advanced or deferred (or increased or decreased) without adversely affecting the outcome. For example, thermostatic loads, such as heat, air conditioning (A/C), refrigeration, etc., may be configured to start at a certain time or for a particular duration, when in fact these times and/or durations may be altered and the same (or similar) result may be obtained (e.g., starting A/C at 7:30 AM instead of 7:00 AM). Note that soft polices may be influenced by external parties, but the specific actions that are taken during the execution of that policy are opaque from the perspective of the external party.

Soft policies may be deconstructed into highly granular levels, forming a set of the acceptable energy reduction measures that might be taken at a specific instance in time. In addition, soft policies may be static policies (unchanging) and/or dynamic policies (changing in response to outside sources, such as time of day, temperature, operating conditions, etc.). As an illustration, the following facets are associated with a particular policy:

Policy type: Either a discreet (binary on/off) or variable action (range of options). In the case of variable actions, the policy may be influenced over a range of 0-100%.

Deferrable: In the case of deferrable policies, the action may be deferred for a specified time period within constraints that are set by the policy.

Energy impact: The potential load impact that is associated with this particular measure. If the policy type is variable, then the estimated energy impact will also vary (perhaps non-linearly) in accordance with how it is influenced.

Priority: The perceived impact that this measure will have on the mission of the facility.

Identifier: A method of uniquely identifying the policy.

Time range: The period of time in which a policy is available. In the case of deferrable policies, the time range can also serve as a load predictor, which might be used to stage demand.

In accordance with one embodiment, a protocol that the energy consumption control device supports is enhanced to facilitate a request for disclosing the soft policy to a policy coordination device via a secured communication link. With reference again to FIG. 1, the disclosed soft policies 140 may be transmitted, using FAN communication technologies, from an energy consumption control device 200 to the policy coordination device 300, which is operable to receive soft policies from a plurality of localized energy consumption control devices.

Notably, as described herein, while the soft policies 140 are illustratively exchanged (and managed) between the energy consumption control devices 200 and the policy coordination device 300, other policies may also be exchanged (and managed). For instance, the exchange of different types of policies (, both soft and set/hard policies) may be useful for forming a complete picture of the overall energy consumption by all consuming devices. Accordingly, when it is said herein that soft policies 140 are exchanged, in certain embodiments herein this may also imply that certain set/hard policies are also exchanged. In certain additional embodiments, it may be possible to change a set/hard policy (e.g., based on certain permissions), such that management of "soft policies" also includes the changing of one or more "hard policies", such as, for example, changing a generator start time (a hard/set time) from 7:30 AM specifically to 7:45 AM specifically, i.e., not a range or soft limit, per se.

According to one or more embodiments herein, as the policy coordination device 300 boots (comes into service), it establishes secure network connectivity with the electric meters 115 associated with the same substation or transformer it controls. Once this connection has been established the policy coordination device uses the meter as a bridge to the facility and establishes a secure and authenticated connection with the energy consumption control device(s) 200 (if any) in that facility. Alternatively, the energy consumption control device(s) and the policy coordination device can establish a secure peer relationship using the Internet, direct radio communication, or PLC links, etc. via the meter or bypassing the meter altogether. Using the communication channel, the policy consolidator 344 of the policy coordination device 300 may, in one specific embodiment request that the energy consumption control device 200 export to the policy coordination device 300 its policies, particularly including soft policies, on energy consumption. A similar process of establishing a secure communication channel is repeated with all other energy consumption control devices associated with the same substation or transformer followed by a request from the policy coordination device for the soft energy consumption policy of each of the specific energy consumption control devices. It should be noted that the various policies from the different companies are collected by the policy coordination device, generally owned by the utility company, and are not shared back with the various companies. Also, while in one embodiment the policy coordination device 300 requests the policies, the policies may simply be obtained or received from the energy consumption control devices 200 in other manners (e.g., a more passive collection).

Once the policies from the energy consumption control devices 200 associated with a given substation or transformer have been collected by the policy consolidator 344, it consolidates the various policies into its local storage (data structure 348), or else externally in a consistent policy database 380. Once all the energy usage policies have been collected and consolidated, the global policy optimizer 346 examines the policies including the soft policies to determine corresponding energy consumption, and creates a global policy aimed at reducing the overall consolidated peak energy consumption between all of the non-cooperating enterprises/companies.

The global policy may be embodied as corresponding (individualized) policy control commands (150 in FIG. 1) transmitted from the policy coordination device 300 to one or more of the plurality of localized energy consumption control devices 200. The energy consumption control device then receives these policy control commands 150 from the policy coordination device, and controls operation of one or more energy consuming devices 110 (within the soft limits or other permissions) based on the global policy determined by the policy coordination device. Example policy control commands 150 include, among other things, immediate action commands (, turn devices 110 on/off), specific activation time commands (e.g., turn devices on/off at a certain time), and soft policy narrowing commands (e.g., reducing an activation "soft limit" time window from 7:00-8:00 AM to 7:00-7:30 AM), etc. In one embodiment, the external policy coordination device may be able to place specific tags into the soft policy of the energy consumption control device indicating a preferred trigger point for the policy to be activated, thus effectively converting a soft policy into a more rigid policy. Also, as noted above, certain set/hard policies may also be changed outright, assuming appropriate permissions to do so have been granted.

As an example, assume five companies each having a peak energy consumption of 100 KW controlled by their respective energy consumption control device 200. When the five energy consumption control devices operate independently, every so often the utility may need to supply 500 KW (for the five companies, each consuming 100 KW). However, using the global policy, the individual peaks of consumptions of the various companies are controlled in a manner which reduces the probability of overlapping peaks, thus reducing the overall total peak energy consumption seen by the utility.

Figure 5:
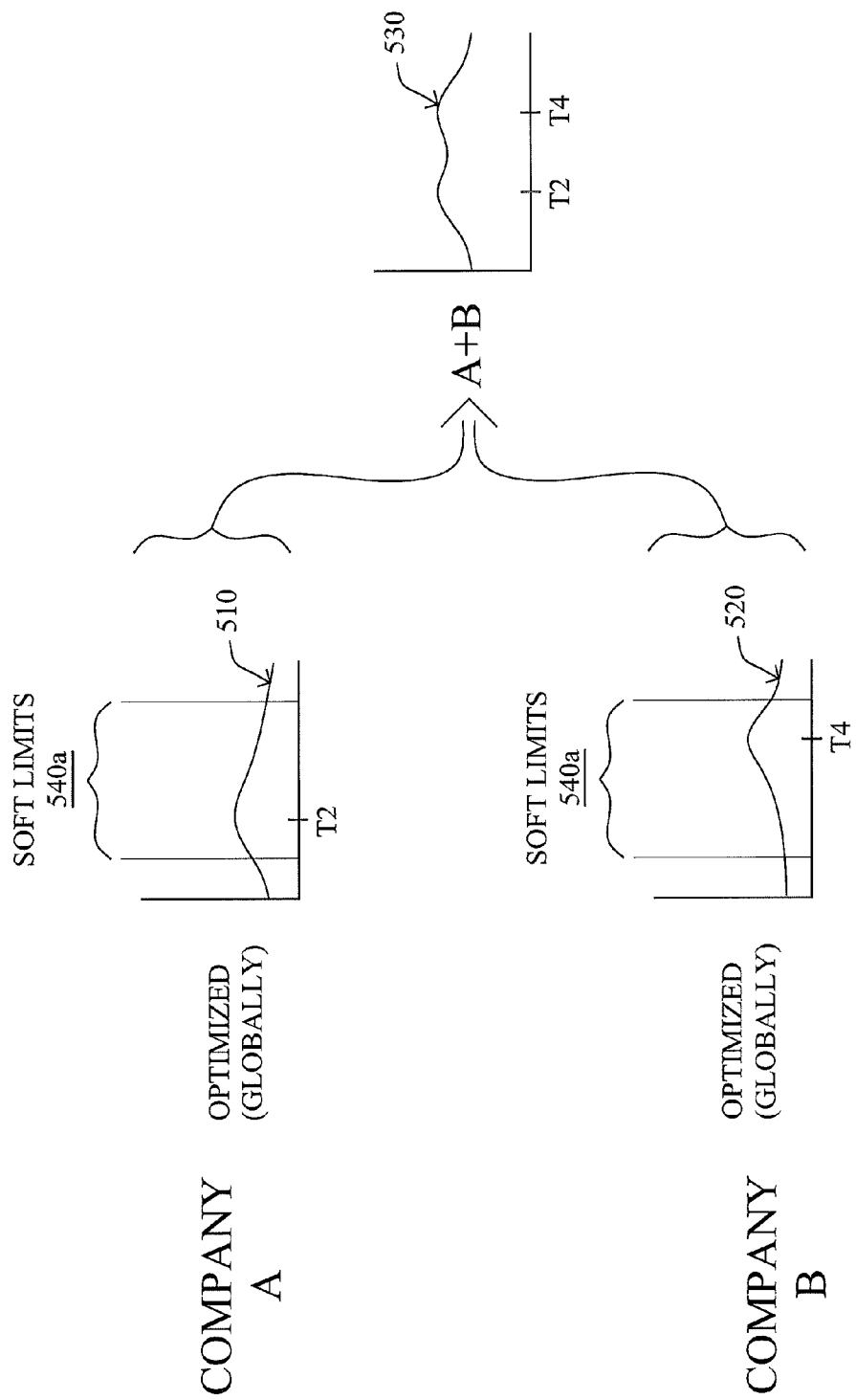
FIG. 5 illustrates an example of globally optimized energy policies.

A simplified illustration of this is shown in FIG. 5, in which the energy utilization result of the two independently optimized soft policies of FIG. 4 have been adjusted such that their respective peaks (usage 510 peaking at T2 and 520 peaking at T4) do not overlap, and the energy consumption result 530 of the globally optimized policy is reduced (in comparison to the energy consumption 430 shown in FIG. 4). Unlike other systems in which the system limits the consumption of customers in order to prevent the energy consumption from exceeding a specific value (e.g., 500 KW in the previous example), the techniques herein use the global policy to manage the peaks of consumption of the various C&I facilities (e.g., shifting the peaks) so as not to coincide with each other. In particular, this is made possible due to the sharing of the energy consumption policies including soft policies, and adjusting the energy consumption policies of the individual devices 110 within the defined soft limits (shown as timing range 540*a*+*b*), e.g., slack, mentioned above.

Note that a particular policy control command may also increase peak energy consumption by a particular localized energy consumption control device in order to reduce the overall peak energy consumption. For example, a modified soft policy may request a specific C&I facility to consume more than the 100 KW at a specific time so that its energy consumption during peak consumption of another C&I facility would drop down significantly, thus bringing the overall energy consumption below 500 KW.

In accordance with one embodiment, after calculating a globally optimized policy, the global policy optimizer 346 may communicate updates or changes with each localized energy consumption control device 200 to adjusts its policy. For example, the policy coordination device may detect a change in its corresponding energy delivery system, such as an environmental change or a change in electrical grid conditions. In response, if the global policy changes, then the policy coordination device may create a new policy control command based on the detected change and transmits it to one or more localized energy consumption control devices. In addition, these changes may be based on further monitoring of the energy utilization of the system, such as where further modifications (e.g., timing adjustments, soft limit narrowing, etc.) may be attempted to better distribute the energy demands.

It should be noted that the embodiments herein may apply to both cases in which a policy is either static (fixed) or dynamic (e.g., the system checks a weather site, time of sunrise and sunset, etc.). With a static policy, in which the policy remains generally unaffected by environmental conditions, the global policy optimizer 346 need only calculate the globally optimized policy periodically to ensure that if any individual soft policy changes from a localized energy consumption control device 200, a new globally optimized policy is calculated. With a dynamic policy, in which the policy adapts based on environmental conditions, the optimization and distribution of policies may occur either periodically (e.g., daily), or whenever certain environmental factors change. As an example, a static policy may include turning off a generator at midnight, regardless of the time of year, while a dynamic policy may include turning on a secondary heater in response to outside temperature falling below a certain value.

Figure 6:
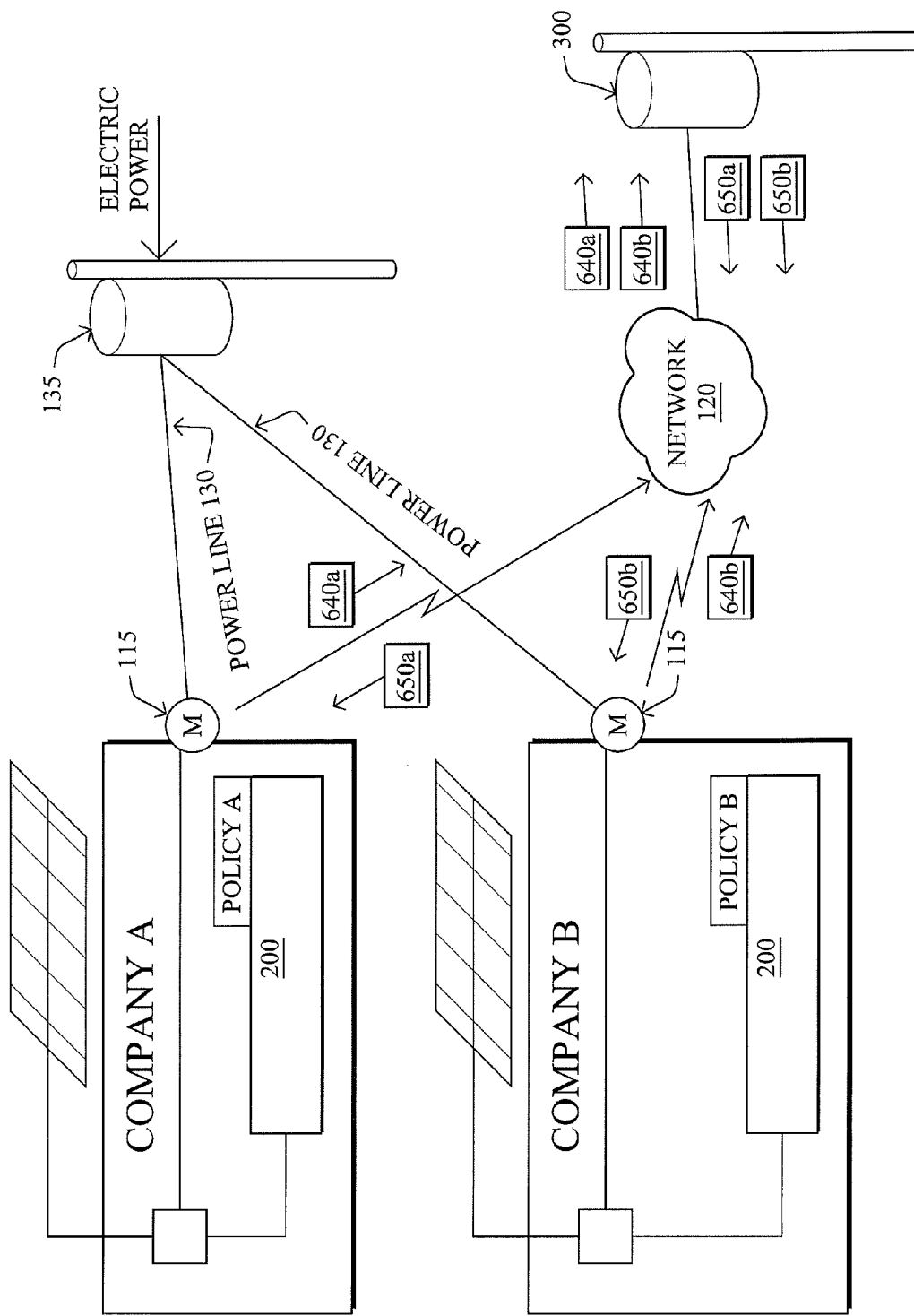
FIG. 6 illustrates an example energy distribution network with energy generating assets.

FIG. 6 illustrates an additional embodiment of the disclosure, where energy generating assets 630 may be connected and managed according to techniques described herein. Illustratively, the asset 630 as shown is a rooftop solar panel, though other energy generating assets may be used, such as small wind turbines, backup generators (e.g., diesel), and others, such as battery backup (for example, from electric vehicles charging on the power supply, e.g., to buffer short term solar variability). In current systems, a utility company generally is only aware of the amount of energy being used/consumed. According to the techniques herein, however, a localized energy consumption control device may measure the energy supplied by a particular generating asset 630, and may relay this information (e.g., the amount currently provided, the amount capable of providing, any policies relating to timing of energy providing such as duration, time of day, etc.). The policy coordination device receives this transmitted information 640 (e.g., 640a and/or 640b), and may create an asset policy control command 650 (650a and/or 650b) based on the global policy and the received information. By then transmitting the asset policy control command, the particular localized energy consumption control device receiving it may adjust the policy of the operation of one or more of the energy generating assets. For example, the policy may be adjusted causing the device to be activated to supply more power to the system. Alternatively or in addition, the asset control command may be (or additionally result in) a policy control command, such as where a particular company may prolong use of their air conditioning in the event that the solar panels 630 are producing sufficient power to avoid an energy consumption peak overlapping with that of another company. Note that since many energy generating assets are variable and intermittent (e.g., solar, wind, etc.), and as such, the policies and/or commands associated with such assets may be particularly dynamic in response to such changes, as noted above.

Figure 7:
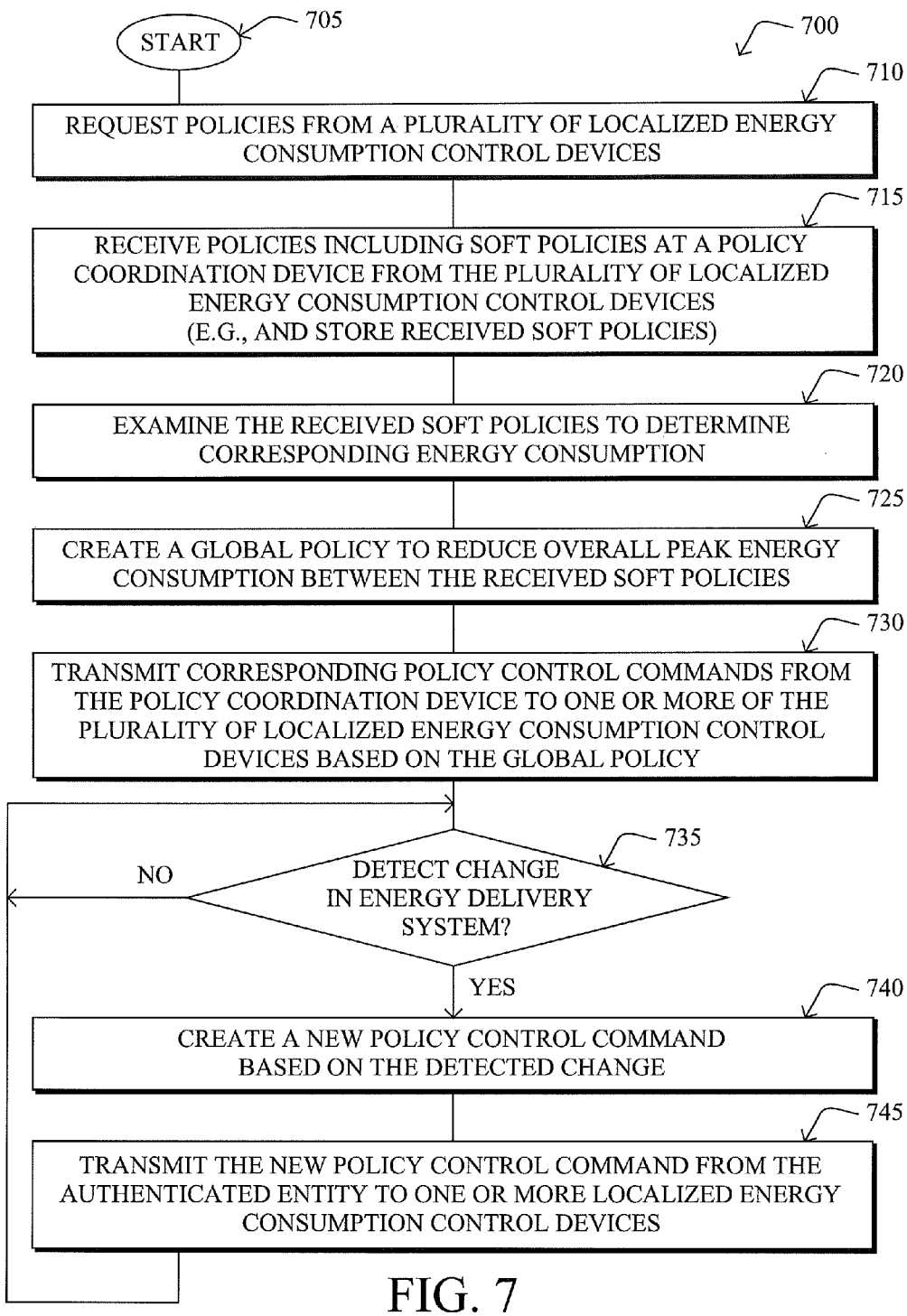
FIG. 7 illustrates an example simplified procedure for cross-profile coordination of energy consumption policies from the perspective of a policy coordination device.

FIG. 7 illustrates an example simplified procedure for cross-profile coordination of energy consumption policies in accordance with one or more embodiments described herein, from the perspective of a policy coordination device 300. The procedure 700 starts at step 705, and continues to step 710, where, in an optional embodiment, the policy coordination device requests soft policies (e.g., and/or other policies, as noted above) from a plurality of localized energy consumption control devices 200. In step 715, due to either the explicit request or in an unsolicited manner, the policy coordination device receives policies including soft policies 140 from the plurality of localized energy consumption control devices, and, may store the received policies (e.g., locally or in a database 380).

By examining the received soft policies in step 720, the policy coordination device may determine corresponding energy consumption, and may then in step 725 create a global policy to reduce overall peak energy consumption between the received soft policies, as described in detail above. The global policy is then transmitted in step 730 as corresponding policy control commands to one or more of the plurality of localized energy consumption control devices. Notably, in the event that there is a detected change in the energy delivery system in step 735, then a new policy control command 150 may be created based on the detected change in step 740, and transmitted in step 745. The procedure 700 may continue to monitor for changes as shown, or else may restart to request and/or receive updated (or additional) soft policies.

Figure 8:
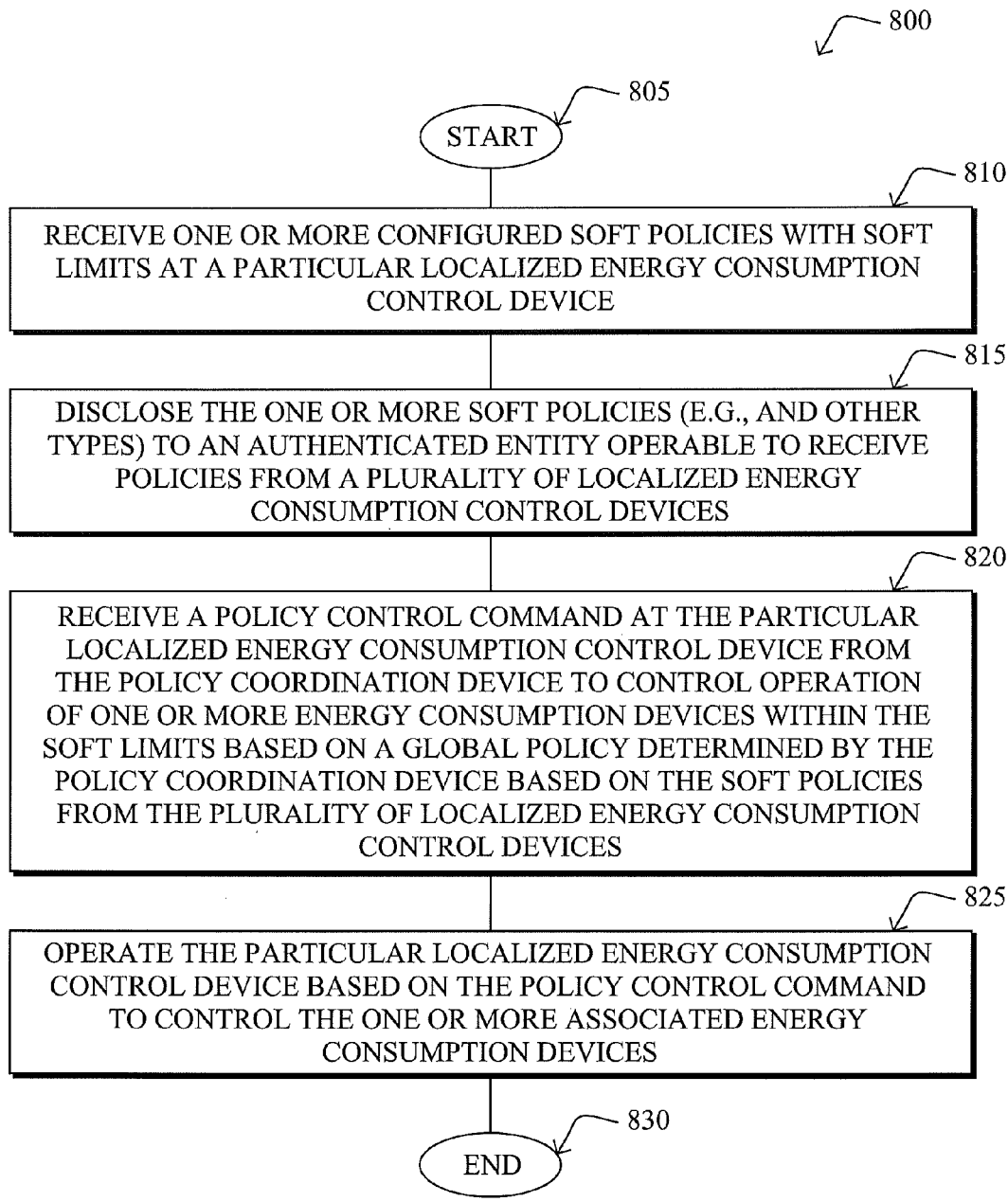
FIG. 8 illustrates an example simplified procedure for cross-profile coordination of energy consumption policies from the perspective of a localized energy consumption control device.

FIG. 8 illustrates an example simplified procedure for cross-profile coordination of energy consumption policies in accordance with one or more embodiments described herein, from the perspective of a localized energy consumption control device 200. The procedure 800 starts at step 805, and continues to step 810, where the localized energy consumption control device receives one or more configured soft policies with soft limits, e.g., from a local system administrator or a remote administration device. In step 815, the localized energy consumption control device discloses the one or more soft policies 140 to a policy coordination device 300, and may then, in step 820, receive a policy control command 150 to modify local energy consumption policies used to control operation of one or more energy consuming devices 110 within the soft limits based on a global policy determined by the policy coordination device based on the policies including soft policies from a plurality of localized energy consumption control devices, as described in greater detail above. Accordingly, in step 825, the localized energy consumption control device operates based on the modified policy(ies) as indicated by the policy control command to control the one or more associated energy consuming devices, and the procedure 800 ends in step 830, or, alternatively, returns to step 820 as shown to receive updated or additional commands. The procedure 800 may also restart in response to receiving updated (local) soft policies (or other types of policies, as noted above) in step 810.

Figure 9:
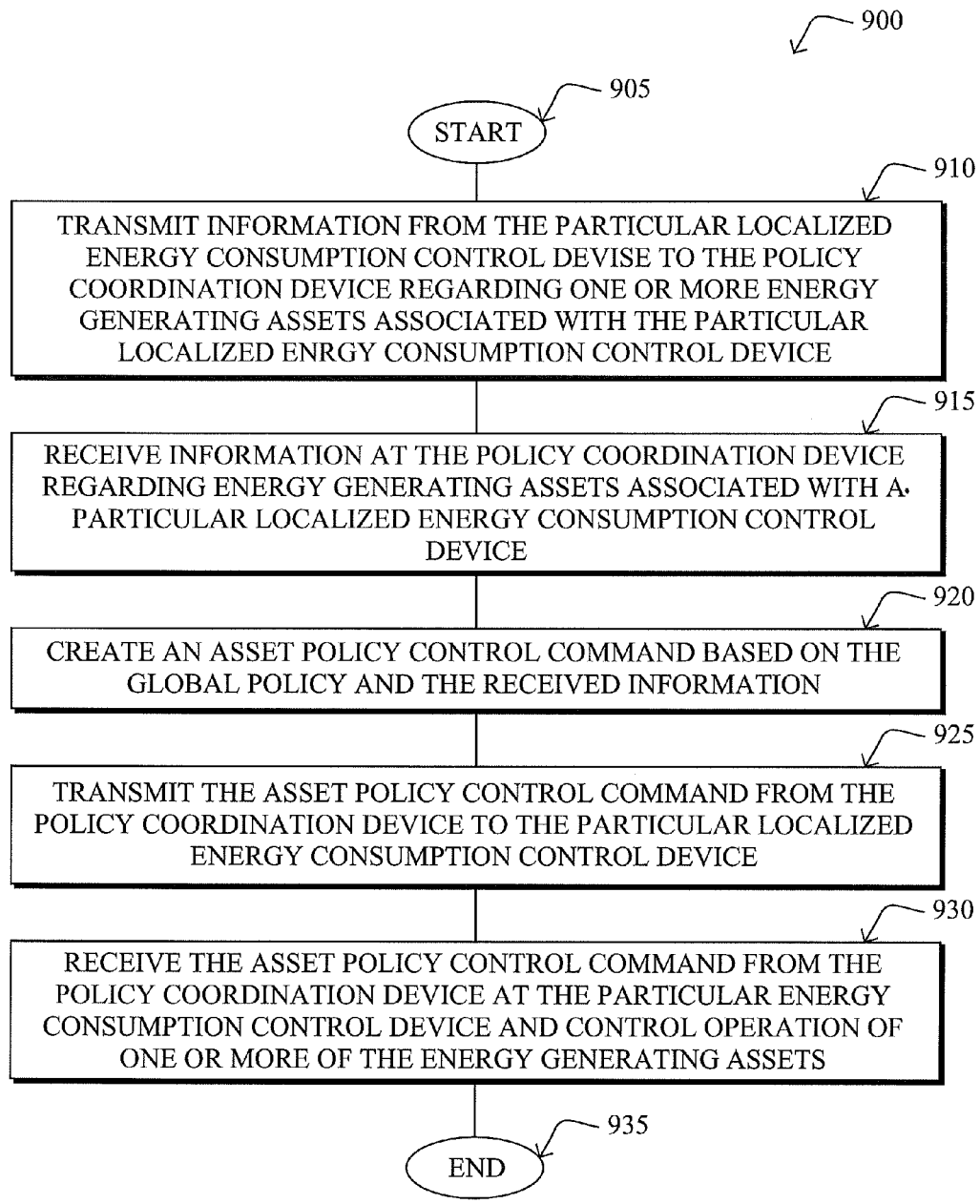
FIG. 9 illustrates an example simplified procedure for cross-profile coordination of energy consumption policies where energy generating assets are available.

FIG. 9 illustrates an example simplified procedure for cross-profile coordination of energy consumption policies where energy generating assets are available in accordance with one or more embodiments described herein. The procedure 900 starts at step 905, and continues to step 910, where a particular localized energy consumption control device transmits information 640 to the policy coordination device regarding one or more energy generating assets 630 associated with the particular localized energy consumption control device. This information is received in step 915 by the policy coordination device 300, which may then create an asset policy modification control command 650 in step 920 based on the global policy and the received information (where, in certain embodiments, the asset policy modification control command 650 is an update to or consideration within a policy control command 150). The command 650 may then be transmitted from the policy coordination device to the particular localized energy consumption control device in step 925, and upon receipt, the particular localized energy consumption control device may control operation of one or more of the energy generating assets accordingly in step 930. The procedure 900 ends in step 935, and may restart to proceed to step 910 with updated or additional energy generating asset information (new values, etc.), or may return to step 920 as shown where the policy coordination device may create an updated asset control command, e.g., in response to an updated global policy.

It should also be noted that while certain steps within procedures 700, 800, and 900 may be optional as described above, the steps in FIGS. 7, 8, and 9 are merely an example for illustration, and certain steps may be included or excluded as desired. Further, while procedures 700, 800, and 900 are described separately, certain steps from each procedure may be incorporated into each other procedure, and the procedures are not meant to be mutually exclusive.

The novel techniques described herein, therefore, provide for cross enterprise and cross-profile coordination of energy consumption policies. In particular, the novel techniques provide integration between Commercial and Industrial (C&I) in-building energy consumption control devices (e.g., mediators) and the substation applications (authenticated entities). In this manner, companies connected to the same transformer or substation are able to harmonize their energy consumption policies without divulging their energy profile to each other, e.g., collectively exhibiting a global policy which is optimized as compared to the execution of the individually optimized polices. In addition, the techniques herein reduce peak demand by harmonizing the energy profiles of different companies, thus reducing the need for invoking harsher control measures such as Demand Responses, brownouts, blackouts, etc. Further, the adaptive (dynamic) techniques above provide functionality that would be difficult, if not practically impossible, to perform manually, such as coordination of dynamic policies.

While there have been shown and described illustrative embodiments that provide for cross-profile coordination of energy consumption policies, it is to be understood that various other adaptations and modifications may be made within the spirit and scope of the embodiments herein. For example, the embodiments have been shown and described herein with relation to particular example devices and example power transmission techniques. However, the embodiments in their broader sense are not as limited, and may, in fact, be used with other types of devices and/or transmission mediums. In fact, similar policy adjustments may be made across other types of controllable utilities, such as gas, water, etc. Also, while the embodiments above generally describe global policy optimization as reducing usage peaks, other optimizations may be configured, and the illustrative example is not meant to limit the embodiments herein.

Notably, according to an aspect of one or more embodiments herein, financial incentives may be put in place by utilities to compensate C&I facilities for disclosing their policies and allowing the utilities to alter the energy consumption patterns of the facility. In accordance with one specific embodiment, a multi-tier incentive plan may be used. For example a C&I facility may be eligible for a small incentive in exchange for exposing its policy to the utility as this will help the utility with its overall energy planning process. Larger incentives may be provided to C&I utilities which would expose a soft energy policy and be willing to adopt a suggested/modified policy by the utility. An even higher incentive may be provided if the C&I facility would comply with the above and in addition would allow the utility to modify the operations of the localized energy consumption control devices as to control some of the energy consumption of the C&I facility. These incentives are merely examples, and may be embodied as financial software executing on a computer (e.g., of a utility company) such as a server (e.g., the policy coordination device) configured to adjust utility (energy) pricing rates based on participation and/or to collect data regarding participation.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving soft policies at a policy coordination device from a plurality of localized energy consumption control devices, the soft policies defining a set of acceptable energy reduction measures and one or more soft limits within which an associated energy consuming device should operate;
   examining the received soft policies to determine corresponding energy consumption;
   creating a global policy to reduce overall peak energy consumption between the received soft policies; and
   transmitting corresponding policy control commands from the policy coordination device to one or more of the plurality of localized energy consumption control devices based on the global policy.

2. The method as in claim 1, further comprising:
   requesting the soft policies from the plurality of localized energy consumption control devices.

3. The method as in claim 1, further comprising:
   storing the received soft policies.

4. The method as in claim 1, wherein a particular policy control command increases peak energy consumption by a particular localized energy consumption control device of the plurality of localized energy consumption control devices in order to reduce the overall peak energy consumption.

5. The method as in claim 1, wherein the policy control commands are selected from a group consisting of: immediate action commands; specific activation time commands; and soft policy narrowing commands.

6. The method as in claim 1, further comprising:
   detecting a change in a corresponding energy delivery system associated with the policy coordination device;
   creating a new policy control command based on the detected change; and
   transmitting the new policy control command from the policy coordination device to one or more of the plurality of localized energy consumption control devices.

7. The method as in claim 6, wherein the detected change is at least one of an environmental change or a change in electrical grid conditions.

8. The method as in claim 1, wherein the received soft policies are each selected from a group consisting of: static policies; and dynamic policies.

9. The method as in claim 1, further comprising:
   receiving information at the policy coordination device regarding energy generating assets associated with a particular localized energy consumption control device of the plurality of localized energy consumption control devices;
   creating an asset control command based on the global policy and the received information; and
   transmitting the asset control command from the policy coordination device to the particular localized energy consumption control device.

10. An apparatus, comprising:
    a network interface adapted to communicate in a computer network;
    a processor coupled to the network interface and adapted to execute one or more processes; and
    a memory storing a process executable by the processor, the process when executed operable to:
    receive soft policies from a plurality of localized energy consumption control devices, the soft policies defining a set of acceptable energy reduction measures and one or more soft limits within which an associated energy consuming device should operate;
    examine the received soft policies to determine corresponding energy consumption;
    create a global policy to reduce overall peak energy consumption between the received soft policies; and
    transmit corresponding policy control commands to one or more of the plurality of localized energy consumption control devices based on the global policy.

11. The apparatus as in claim 10, wherein the policy control commands are selected from a group consisting of: immediate action commands; specific activation time commands; and soft policy narrowing commands.

12. The apparatus as in claim 10, wherein the process when executed is further operable to:
detect a change in a corresponding energy delivery system associated with the apparatus;
create a new policy control command based on the detected change; and
transmit the new policy control command to one or more localized energy consumption control devices.

13. The apparatus as in claim 10, wherein the process when executed is further operable to:
receive information regarding energy generating assets associated with a particular localized energy consumption control device of the plurality of localized energy consumption control devices;
create an asset control command based on the global policy and the received information; and
transmit the asset control command to the particular localized energy consumption control device.

14. A method, comprising:
receiving a plurality of configured soft policies with soft limits at a particular localized energy consumption control device, the soft policies defining a set of acceptable energy reduction measures and the soft limits within which an associated energy consuming device should operate;
disclosing the plurality of soft policies to a policy coordination device operable to receive soft policies from a plurality of localized energy consumption control devices;
receiving a policy control command at the particular localized energy consumption control device from the policy coordination device to control operation of one or more energy consuming devices within the soft limits based on a global policy determined by the policy coordination device based on the soft policies from the plurality of localized energy consumption control devices; and
operating the particular localized energy consumption control device based on the policy control command to control the one or more associated energy consuming devices.

15. The method as in claim 14, wherein policy control commands are selected from a group consisting of: immediate action commands; specific activation time commands; and soft policy narrowing commands.

16. The method as in claim 14, wherein the received configured soft policies are each selected from a group consisting of: static policies; and dynamic policies.

17. The method as in claim 14, further comprising:
transmitting information from the particular localized energy consumption control device to the policy coordination device regarding one or more energy generating assets associated with the particular localized energy consumption control device; and
receiving an asset control command from the policy coordination device at the particular localized energy consumption control device to control operation of one or more of the energy generating assets.

18. An apparatus, comprising:
a network interface adapted to communicate in a computer network;
a processor coupled to the network interface and adapted to execute one or more processes; and
a memory storing a process executable by the processor, the process when executed operable to:
receive a plurality of configured soft policies with soft limits, the soft policies defining a set of acceptable energy reduction measures and the soft limits within which an associated energy consuming devices should operate;
disclose the plurality of soft policies to a policy coordination device operable to receive soft policies from a plurality of localized energy consumption control devices;
receive a policy control command from the policy coordination device to control operation of one or more energy consuming devices within the soft limits based on a global policy determined by the policy coordination device based on the soft policies from the plurality of localized energy consumption control devices; and
control the one or more energy consuming devices based on the policy control command.

19. The apparatus as in claim 18, wherein policy control commands are selected from a group consisting of: immediate action commands; specific activation time commands; and soft policy narrowing commands.

20. The apparatus as in claim 18, wherein the process when executed is further operable to:
transmit information to the policy coordination device regarding one or more energy generating assets associated with the apparatus; and
receive an asset control command from the policy coordination device to control of one or more of the energy generating assets.

* * * * *